US012754194B2

(12) United States Patent
Byeon et al.

(10) Patent No.: US 12,754,194 B2
(45) Date of Patent: Oct. 6, 2026

(54) SAMPLE ANALYSIS SYSTEM

(71) Applicant: SAMSUNG ELECTRONICS CO., LTD., Suwon-si (KR)

(72) Inventors: Kyeongsup Byeon, Suwon si (KR); Kwangjun Kim, Suwon si (KR); Soohyun Kim, Suwon si (KR); Eunju Park, Suwon si (KR); Heejae Park, Suwon si (KR); Huigwan Lee, Suwon si (KR); Sunghan Jung, Suwon si (KR); Soonwook Hwang, Suwon si (KR); Kimoon Lee, Suwon si (KR); Seounghyun Seok, Suwon si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 363 days.

(21) Appl. No.: 18/528,978

(22) Filed: Dec. 5, 2023

(65) Prior Publication Data

US 2024/0310397 A1 Sep. 19, 2024

(30) Foreign Application Priority Data

Mar. 14, 2023 (KR) ........................ 10-2023-0033465

(51) Int. Cl.
*G01N 35/00* (2006.01)
*G01N 35/04* (2006.01)

(52) U.S. Cl.
CPC ... *G01N 35/0099* (2013.01); *G01N 35/00732* (2013.01); *G01N 35/04* (2013.01); *G01N 2035/00752* (2013.01)

(58) Field of Classification Search
CPC ............ C12Q 1/6883; C12Q 2600/166; C12Q 2600/178; G01N 2035/00752; G01N 2035/0406; G01N 2035/0437; G01N 2035/0462; G01N 2035/0465; G01N 35/00732; G01N 35/0099; G01N 35/04
See application file for complete search history.

(56) References Cited

U.S. PATENT DOCUMENTS

| | | | | |
|---|---|---|---|---|
| 12,415,678 | B2 * | 9/2025 | Choi | B25J 11/005 |
| 2015/0355210 | A1 * | 12/2015 | Matsumoto | G01N 35/025 422/547 |
| 2021/0270858 | A1 | 9/2021 | Imai et al. | |

FOREIGN PATENT DOCUMENTS

| | | |
|---|---|---|
| CN | 213801433 | 7/2021 |
| JP | 2001278409 | 10/2001 |
| JP | 6567814 | 8/2019 |
| JP | 2022042669 | 3/2022 |
| JP | 7145360 | 9/2022 |
| KR | 10-2151764 | 8/2020 |
| KR | 10-2162756 | 9/2020 |
| KR | 10-2022-0073887 | 6/2022 |

* cited by examiner

*Primary Examiner* — Jennifer Wecker
(74) *Attorney, Agent, or Firm* — Morgan, Lewis & Bockius LLP

(57) ABSTRACT

A sample analysis system includes a loading/unloading part including a container carry-in device, by which a container containing a sample is carried in, and a container carry-out device, by which an empty container from which the sample has been removed is carried out, and an analysis part including a buffer device configured to store the container, an analysis device configured to analyze the sample contained in the container, a cleaning device configured to clean the container, and a transfer robot configured to convey the container.

20 Claims, 15 Drawing Sheets

SAMPLE ANALYSIS SYSTEM

CROSS-REFERENCE TO RELATED APPLICATION

This application is based on and claims priority under 35 U.S.C. § 119 to Korean Patent Application No. 10-2023-0033465, filed on Mar. 14, 2023, in the Korean Intellectual Property Office, the disclosure of which is incorporated by reference herein in its entirety.

TECHNICAL FIELD

This disclosure relates generally to a sample analysis system and a sample analysis method.

DISCUSSION OF RELATED ART

A sample analysis system may perform an analysis on a variety of samples provided in containers, such as organic samples (e.g., blood or saliva); water samples; chemical samples; and so forth. In general, the sample analysis requires tasks, such as inputting a sample into a container, opening and closing an inlet of the container, and conveying the container between facilities (different functional areas of the sample analysis system). Typically, most of these tasks depend on manual work of operators. During the work of handling the container that contains the sample, however, leakage of the sample may cause worker safety accidents.

SUMMARY

Embodiments of the inventive concept provide a sample analysis system and method.

According to an aspect of the inventive concept, there is provided a sample analysis system including a loading/unloading part including a container carry-in device, by which a container containing a sample is carried in, and a container carry-out device, by which an empty container from which the sample has been removed is carried out, and an analysis part including a buffer device configured to store the container, an analysis device configured to analyze the sample contained in the container, a cleaning device configured to clean the container, and a transfer robot configured to convey the container, wherein the container carry-in device includes a carry-in chamber including a front door and a rear door, the rear door being configured to open and close a passage between a carry-in space of the carry-in chamber and the analysis part, a first container table located on one side of the front door and upon which the container is placed, a second container table located on one side of the rear door and upon which the container is placed, a carrying robot configured to convey the container between the first container table and the second container table, and a label reader configured to detect an identification label on the container.

According to another aspect of the inventive concept, there is provided a sample analysis system including a loading/unloading part including a container carry-in device, by which a container containing a sample is carried in, and a container carry-out device, by which an empty container from which the sample has been removed is carried out, and an analysis part including a buffer device configured to store the container, an analysis device configured to analyze the sample contained in the container, a cleaning device configured to clean the container, and a transfer robot configured to convey the container, wherein the container carry-in device includes a carry-in chamber including a first front door and a first rear door, the first rear door being configured to open and close a passage between a carry-in space of the carry-in chamber and the analysis part, a first container table located on one side of the first front door and upon which the container is placed, a second container table located on one side of the first rear door and upon which the container is placed, a carrying robot configured to convey the container between the first container table and the second container table, and a first label reader configured to detect an identification label on the container, wherein the container carry-out device includes a carry-out chamber including a second front door and a second rear door, the second rear door being configured to open and close a passage between a carry-out space of the carry-out chamber and the analysis part, a support shelf upon which the empty container is placed, and a second label reader configured to detect the identification label on the empty container, wherein the buffer device includes a buffer chamber including a buffer door, a buffer table which is located inside the buffer chamber and upon which the container is placed, and a third label reader configured to detect the identification label on the container placed on the buffer table.

According to another aspect of the inventive concept, there is provided a sample analysis method including detecting an identification label on a container that is carried in a carry-in chamber, conveying the container from the carry-in chamber to an analysis device using a transfer robot, and analyzing a sample contained in the container using the analysis device, conveying the container from the analysis device to a cleaning device using the transfer robot, cleaning the container with the cleaning device, and conveying the container from the cleaning device to a carry-out chamber using the transfer robot.

In another aspect, a sample analysis system includes: a loading/unloading part comprising a container carry-in device, by which a container containing a sample is carried in, and a container carry-out device, by which an empty container from which the sample has been removed is carried out; and an analysis part comprising a buffer device configured to store the container, an analysis device configured to analyze the sample contained in the container, a cleaning device configured to clean the container, and a first robot configured to convey the container. The container carry-in device includes: a carry-in chamber comprising a front door and a rear door, where the rear door opens and closes a passage between a carry-in space of the carry-in chamber and the analysis part; at least one surface, located in the carry-in space, upon which the container is placed; a second robot configured to convey the container between a first position on the at least one surface closer to the front door than the rear door, to a second position on the at least one surface closer to the rear door than the front door; and a label reader configured to detect an identification label on the container.

BRIEF DESCRIPTION OF THE DRAWINGS

Embodiments will be more clearly understood from the following detailed description taken in conjunction with the accompanying drawings in which.

DETAILED DESCRIPTION OF EMBODIMENTS

Figure 1:
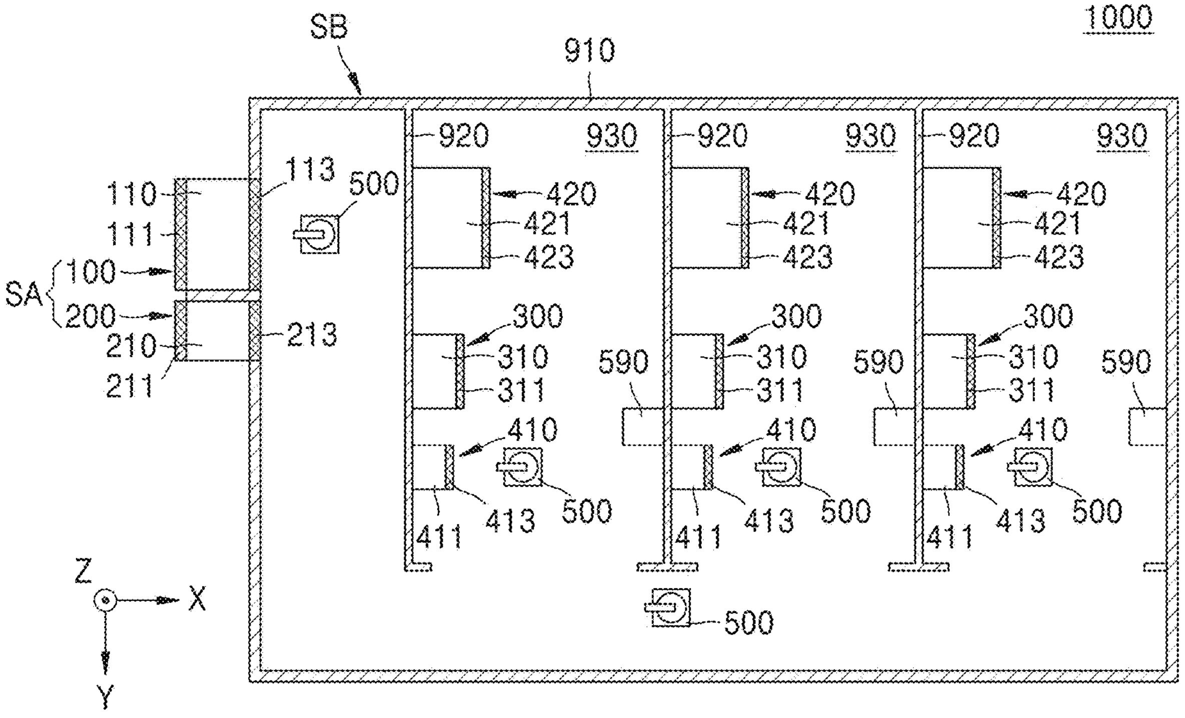
FIG. 1 is a configuration diagram showing a sample analysis system according to embodiments.

Hereinafter, embodiments of the inventive concept are described in detail with reference to the accompanying drawings. The same reference numerals are given to the same elements in the drawings, and repeated descriptions thereof are omitted.

Figure 2:
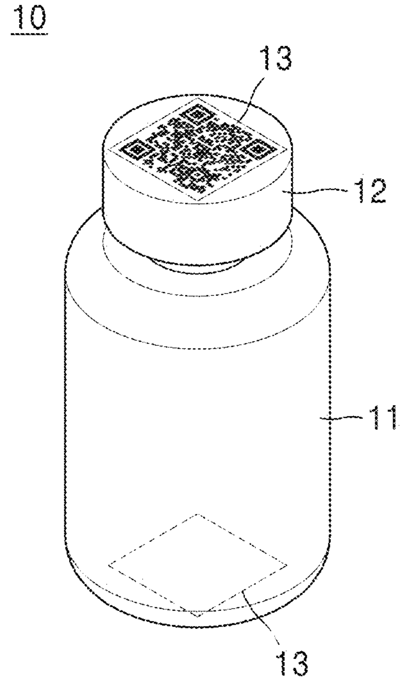
FIG. 2 is a perspective view showing a container.
Figure 3:
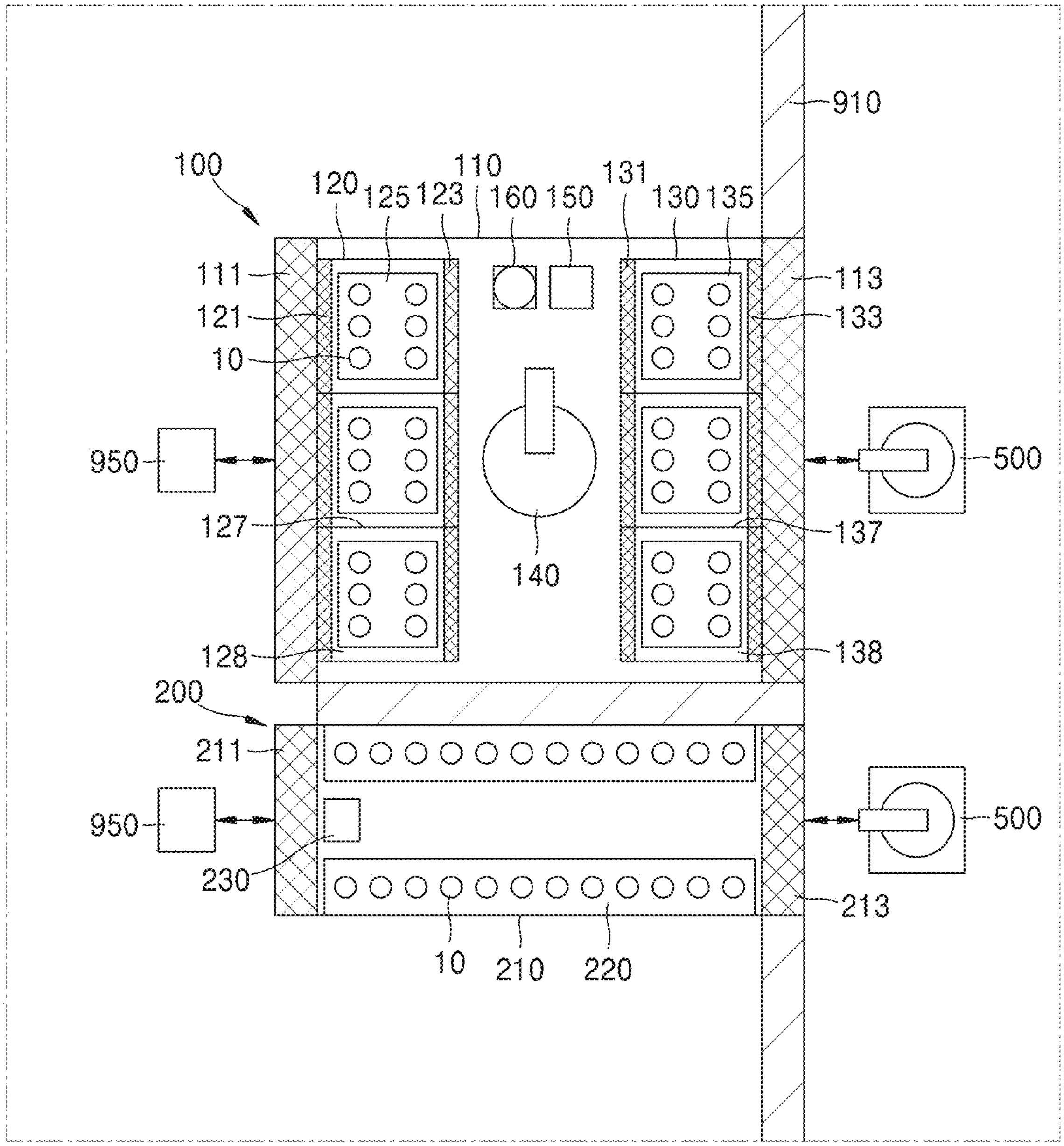
FIG. 3 is a configuration diagram showing a loading/unloading part according to embodiments.

FIG. 1 is a configuration diagram showing a sample analysis system 1000 according to embodiments. FIG. 2 is a perspective view showing a container (or bottle) 10. FIG. 3 is a configuration diagram showing a loading/unloading part SA of FIG. 2 according to embodiments.

Referring to FIGS. 1-3, the sample analysis system 1000 may perform a series of tasks to analyze a sample. Some examples of the sample may include a liquid sample (e.g., blood, saliva, water), a solid sample, and various chemical solutions. The sample analysis system 1000 may detect properties of the sample through the sample analysis and compare the detected properties of the sample with reference values to determine suitability of the sample.

In the sample analysis system 1000, the sample may be provided in the container 10. Here, the container 10 may include a container body 11 and a lid 12 that is separated from or coupled to the container body 11 so as to open and close an inlet of the container body 11. Screw threads are provided on each of an upper portion of the container body 11 and an inner surface of the lid 12, and the lid 12 may be coupled and decoupled from the container body 11 by engagement/disengagement between the screw threads of the container body 11 and the screw threads of the lid 12. The container 10 may include at least one identification (ID) label 13. For example, the identification label 13 may be provided on each of the lid 12 and the bottom of the container body 11. The identification label 13 may include a 1-dimensional barcode a 2-dimensional barcode, or combinations thereof.

The sample analysis system 1000 may automate a series of tasks performed for sample analysis. For example, the sample analysis system 1000 may perform a task of providing an empty container 10 to an operator 950 (see FIG. 3) situated outside the sample analysis system 1000 (so that the operator may place a sample therein), a task of detecting the identification label 13 on the container 10 containing the sample provided from the operator 950, a task of conveying the container 10 containing the sample to an analysis device 410, a task of cleaning the container 10 in which the sample analysis has been completed, and a task of storing the empty container 10, in which the cleaning has been completed, in a storage position. Based on the information obtained by detecting the identification label 13 on the container 10, it is possible to determine the current position of the particular container 10 inside the sample analysis system 1000 (e.g., a known or predetermined position of the particular container 10 at which the identification label 13 is actually read by a reading device), the type of sample contained in the container 10, and details of requests associated with the particular container requested by the operator 950.

The sample analysis system 1000 may include a loading/unloading part SA and an analysis part SB.

The loading/unloading part SA may function to carry the container 10 in and out between an outside area (e.g., an air-filled space) and an inner space of the analysis part SB. The loading/unloading part SA includes a container carry-in device 100, through which a container 10 containing a sample is carried in from the outside area and which provides the container 10 to the analysis part SB, and a container carry-out device 200, which receives an empty container 10 from the analysis part SB and through which the empty container 10 is carried out. The container carry-out device 200 may provide the empty container 10 and an accessory (e.g., a sticker, a plastic bag, etc.) to the operator 950 on the outside area.

The inner space of the analysis part SB is defined by an outer wall 910 and may be maintained to have a predetermined clean class (state). The analysis part SB may include a buffer device 300, an analysis device 410, a cleaning device 420, a transfer robot 500 configured to convey the container 10 inside the analysis part SB, and a charger 590 configured to supply power for charging a battery of the transfer robot 500. The inner space of the analysis part SB may include a plurality of bays 930 that are partitioned by partition walls 920. Each of bays 930 may include at least one buffer device 300, at least one analysis device 410, at least one cleaning device 420, and at least one charger 590. The analysis part SB may include at least one transfer robot 500. The transfer robot 500 may be configured to convey the container 10 between two devices selected from among the container carry-in device 100, the container carry-out device 200, the buffer device 300, the analysis device 410, and the cleaning device 420.

The buffer device 300 may be configured to temporarily store the container 10 inside the analysis part SB. The buffer device 300 may include a buffer chamber 310 with a door 311. The door 311 interfaces with the transfer robot 500 and may be configured to operate automatically. The door 311 includes a communication sensor (e.g., a parallel input output (PIO) sensor) for interface with the transfer robot 500 and may be opened and closed by a signal from the transfer robot 500.

The analysis device 410 may be configured to analyze the sample contained in container 10. The analysis device 410 may include an analysis chamber 411 with a door 413. The door 413 interfaces with the transfer robot 500 and may be configured to operate automatically. The door 413 may include a communication sensor (e.g., a PIO sensor) for interface with the transfer robot 500 and may be opened and closed by a signal from the transfer robot 500. The analysis chamber 411 may include various equipment for analyzing the sample. The analysis device 410 may determine whether the properties of the sample detected through the sample analysis satisfy reference values and may then make a pass/fail decision for the sample. In embodiments, when the sample is determined to be disqualified in a primary analysis operation, the analysis device 410 may perform re-analysis (i.e., a secondary analysis operation) on the sample.

The cleaning device 420 may be configured to discard the analyzed sample and clean the container 10. The cleaning device 420 may include a cleaning chamber 421 with a door 423. The door 423 interfaces with the transfer robot 500 and may be configured to operate automatically. The door 423 may include a communication sensor (e.g., a PIO sensor) for interface with the transfer robot 500 and may be opened and closed by a signal from the transfer robot 500. The cleaning device 420 may include various equipment for cleaning the sample. For example, the cleaning device 420 may include a cleaning nozzle configured to spray a cleaning solution, a drying unit for drying the container 10, and a discharge unit for collecting and discharging the waste sample.

Referring still to FIGS. 1 to 3, the container carry-in device 100 may include a carry-in chamber 110 providing a carry-in space. The carry-in chamber 110 may include a first front door 111 that opens and closes a passage between the carry-in space and the outer area in which an operator 950 is located. A first rear door 113 of the carry-in chamber 110 may open and close a passage between the carry-in space and the inner space of the analysis part SB. In embodiments, the first front door 111 interfaces with the operator 950 and may be configured to operate manually or automatically. In embodiments, the first rear door 113 interfaces with the transfer robot 500 provided in the analysis part SB and may be configured to operate automatically. The first rear door 113 may include a communication sensor (e.g., a PIO sensor) for interface with the transfer robot 500 and may be opened and closed by a signal from the transfer robot 500.

The container carry-in device 100 may include a first stocker 120, a second stocker 130, a carrying robot 140, a first label reader 150, and a rotary table 160. The first stocker 120, the second stocker 130, the carrying robot 140, the first label reader 150, and the rotary table 160 may be provided in the carry-in space of the carry-in chamber 110. Herein, a "stocker" may include a surface upon which containers are stocked, e.g., in a pre-arranged manner through use of protrusions or the like for temporary mounting at predetermined locations on the surface. The first stocker 120 may be located on one side of the first front door 111, and the second stocker 130 may be located on one side of the first rear door 113 (each side being within the carry-in chamber 110). The first stocker 120 and the second stocker 130 may be spaced apart from each other with the carrying robot 140 therebetween. Each of the first stocker 120 and the second stocker 130 may store a plurality of containers 10 in an arranged manner.

The inner space of the first stocker 120 may include a plurality of first sub-spaces 128 partitioned by a partition wall 127. Each of the first sub-spaces 128 may communicate with an exhaust port 129 (see FIG. 4A) and may be exhausted through an exhaust device connected to the exhaust port 129.

A first container table 125 on which a plurality of containers 10 are mounted may be located in each of the first sub-spaces 128 of the first stocker 120. The plurality of first sub-spaces 128 of the first stocker 120 may respectively accommodate containers 10 that contain samples of different properties. For example, in the first stocker 120, one of the plurality of first sub-spaces 128 may be provided with a first container table 125 on which a container 10 containing an acid sample is mounted; another one of the plurality of first sub-spaces 128 may be provided with another first container table 125 on which a container 10 containing a base sample is mounted, and a further one of the plurality of first sub-spaces 128 may be provided with a further first container table 125 on which a container 10 containing an organic sample is mounted. In other embodiments, all containers 10 (regardless of the type of sample contained therein) placed within the first stocker 120 are arranged on a single first container table 125.

The first stocker 120 may include a plurality of first front stocker doors 121 arranged on one side thereof facing the first front door 111 and a plurality of first rear stocker doors 123 arranged on the other side thereof facing the first rear door 113. The plurality of first front stocker doors 121 may each be driven independently, and the plurality of first rear stocker doors 123 may each be driven independently. Each of the first front stocker doors 121 may be configured to open and close an entrance of a corresponding one first sub-space 128, and each of the first rear stocker doors 123 may be configured to open and close an exit of a corresponding one first sub-space 128. When the container 10 is carried in any one of the first sub-spaces 128 of the first stocker 120 from the outer area, the first front door 111 and any one of the plurality of first front stocker doors 121 are opened, and the container 10 may be mounted on the first container table 125. (As an example, the operator 950 may manually carry each container 10 through the first front door 111 and one of the first front stocker doors 121 and mount the container on one of the first container tables 125, but is not limited thereto.)

The inner space of the second stocker 130 may include a plurality of second sub-spaces 138 partitioned by a partition wall 137. Each of the second sub-spaces 138 communicates with an exhaust port 139 (see FIG. 4A) and may be exhausted through an exhaust device connected to the exhaust port 139.

A second container table 135 on which a plurality of containers 10 are mounted may be located in each of the second sub-spaces 138 of the second stocker 130. The second sub-spaces 138 may respectively accommodate containers 10 that contain samples of different properties. For example, in the second stocker 130, one of the plurality of second sub-spaces 138 may be provided with a second container table 135 on which a container 10 containing an acid sample is mounted, another one of the plurality of second sub-spaces 138 may be provided with another second container table 135 on which a container 10 containing a base sample is mounted, and a further one of the plurality of second sub-spaces 138 may be provided with a further second container table 135 on which a container 10 containing an organic sample is mounted. In other embodiments, all containers 10 (regardless of the type of sample contained therein) placed within the second stocker 130 are arranged on a single second container table 135.

The second stocker 130 may include a plurality of second front stocker doors 131 arranged on one side thereof facing the first front door 111 and a plurality of second rear stocker doors 133 arranged on the other side thereof facing the first rear door 113. The plurality of second front stocker doors 131 may be driven independently, and the plurality of second rear stocker doors 133 may be driven independently. Each of the second front stocker doors 131 may be configured to open and close an entrance of a corresponding one second sub-space 138, and each of the second rear stocker doors 133 may be configured to open and close an exit of a corresponding one second sub-space 138. When the container 10 is carried out from any one of the second sub-spaces 138 of the second stocker 130 to the analysis part SB, the first rear door 113 and any one of the plurality of second rear stocker doors 133 are opened, and the container 10 may be carried out from the second stocker 130 using the transfer robot 500.

The carrying robot 140 grips and holds the container 10 and may convey the container 10 between a first container table 125 of the first stocker 120 and a second container table 135 of the second stocker 130. To this end, the carrying robot

140 may grip and hold the container 10 placed on the first container table 125, convey the container 10 from the first container table 125 to the second container table 135, and position the container 10 at one of multiple mounting positions on the second container table 135. The carrying robot 140 may include gripper fingers configured to grip and hold the container 10. The carrying robot 140 may be or include a vertical articulated robot, a horizontal articulated robot, or a gantry device. A movable range (or conveyance range) of the carrying robot 140 may cover all of the first container tables 125 of the first stocker 120 and all of the second container tables 135 of the second stocker 130.

The first label reader 150 may be located between the first stocker 120 and the second stocker 130. The first label reader 150 may detect the identification (ID) label 13 on the container 10. The first label reader 150 may be or include a stationary reader or a movable reader that moves along a predetermined path. The first label reader 150 may include an image sensor, a camera, or a barcode scanner. In embodiments, the first label reader 150 may detect the identification label 13 of the container 10, for example, an identification label 13 provided on the bottom of the container body 11, while the carrying robot 140 holds the container 10. In embodiments, the first label reader 150 is located on a conveyance path of the carrying robot 140 for the container 10 and may detect the identification label 13 on the container 10 while the carrying robot 140 conveys the container 10 between the first stocker 120 and the second stocker 130.

The rotary table 160 may be located between the first stocker 120 and the second stocker 130. The rotary table 160 may be located on one side of the first label reader 150. The rotary table 160 may include a support body for holding the container 10 and a rotary actuator for rotating the support body. The rotary table 160 may hold the container 10 delivered from the carrying robot 140 and rotate the container 10 about a vertical direction (Z direction). The rotary table 160 may receive the container 10 from the carrying robot 140 and rotate the container 10 such that the container 10 is oriented in a predetermined direction. The rotary table 160 may be configured to separate the lid 12 from the container body 11 and/or regulate locking torque between the container body 11 and the lid 12. In embodiments, while the carrying robot 140 is gripping the lid 12 of the container 10, the rotary table 160 rotates the container body 11 such that the container body 11 rotates relative to the lid 12. Accordingly, it is possible to regulate the locking torque between the container body 11 and the lid 12.

The container carry-out device 200 may include a carry-out chamber 210 providing a carry-out space. The carry-out chamber 210 may include a second front door 211 that opens and closes a passage between the carry-out space of the carry-out chamber 210 and the outer area in which an operator 950 is present and a second rear door 213 that opens and closes a passage between the carry-out space of the carry-out chamber 210 and the inner space of the analysis part SB. In embodiments, the second front door 211 interfaces with the operator 950 and may be configured to operate manually or automatically. In embodiments, the second rear door 213 interfaces with the transfer robot 500 provided in the analysis part SB and may be configured to operate automatically. The second rear door 213 includes a communication sensor (e.g., a PIO sensor) for interface with the transfer robot 500 and may be opened and closed by a signal from the transfer robot 500.

The container carry-out device 200 may include a support shelf 220 and a second label reader 230. The support shelf 220 and the second label reader 230 may be provided in the carry-out space of the carry-out chamber 210.

The support shelf 220 may support a plurality of containers 10. For example, the support shelf 220 having a multi-layer structure may be provided on or proximate to each of one sidewall and an opposite sidewall of the carry-out chamber 210. In embodiments, the support shelf 220 may be configured to convey the containers 10 inside the carry-out chamber 210. For example, a container 10 provided from the analysis part SB is placed on the support shelf 220, and the support shelf 220 may convey the container 10 from the second rear door 213 toward the second front door 211. In embodiments, the support shelf 220 may be configured by a conveyor belt.

The second label reader 230 may detect the identification label 13 on the container 10. The second label reader 230 may be or include a stationary reader or a movable reader that moves along a predetermined path. The second label reader 230 may include an image sensor, a camera, or a barcode scanner.

FIGS. 4A to 4D are views showing example operations of the loading/unloading part SA of the sample analysis system 1000 according to embodiments. Hereinafter, with reference to FIGS. 4A to 4D together with FIGS. 1 to 3, a process of carrying the container 10 in and out through the loading/unloading part SA is illustratively described.

First, according to the request input on a keypad or the like from an operator 950 in the outside area, the container carry-out device 200 may provide an empty container 10 to the operator 950. For instance, when the operator 950 inputs a serial number of a work request that was previously submitted to the container carry-out device 200, a main controller (not shown) of the sample analysis system 1000 transmits a work command corresponding to the input serial number to the container carry-out device 200. The container carry-out device 200 may provide the operator 950 with as many containers 10 as the requested quantity in response to the work command from the main controller. The second label reader 230 of the container carry-out device 200 may scan the identification label 13 of the container 10 provided to the operator 950 and transmit the scanned information to the main controller.

The empty containers 10 stacked in the carry-out chamber 210 of the container carry-out device 200 may be provided from the analysis part SB. More specifically, when the transfer robot 500 to which the work command has been assigned arrives in front of the second rear door 213, the second rear door 213 moves to an open position. Then, the transfer robot 500 may mount the empty container 10 on the support shelf 220 of the carry-out chamber 210.

Next, when each of the first front door 111 of the carry-in chamber 110 and the first front stocker door 121 of a first stocker 120 is switched to an open position, the operator 950 mounts the container 10 containing the sample on the first container table 125 in the first stocker 120. Subsequently, each of the first front door 111 of the carry-in chamber 110 and the first front stocker door 121 is switched from the open position to a closed position.

Figure 4A:
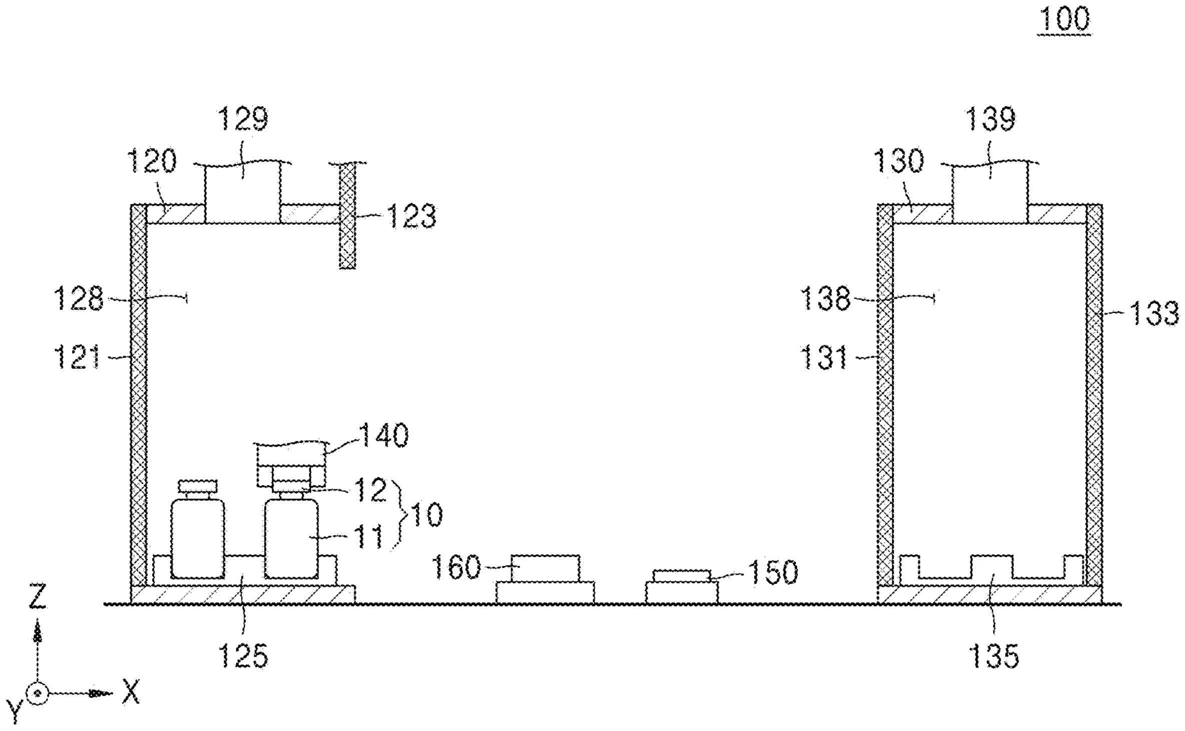
FIGS. 4A, 4B, 4C and 4D are views showing example operations of a loading/unloading part of a sample analysis system according to embodiments.

Referring to FIG. 4A, after the first rear stocker door 123 of the first stocker 120 is switched to an open position, the carrying robot 140 moves a gripper finger thereof through the open rear stocker door 123, and grips, holds and begins to remove the container 10 from the first stocker 120 through the open stocker door 123.

Figure 4B:
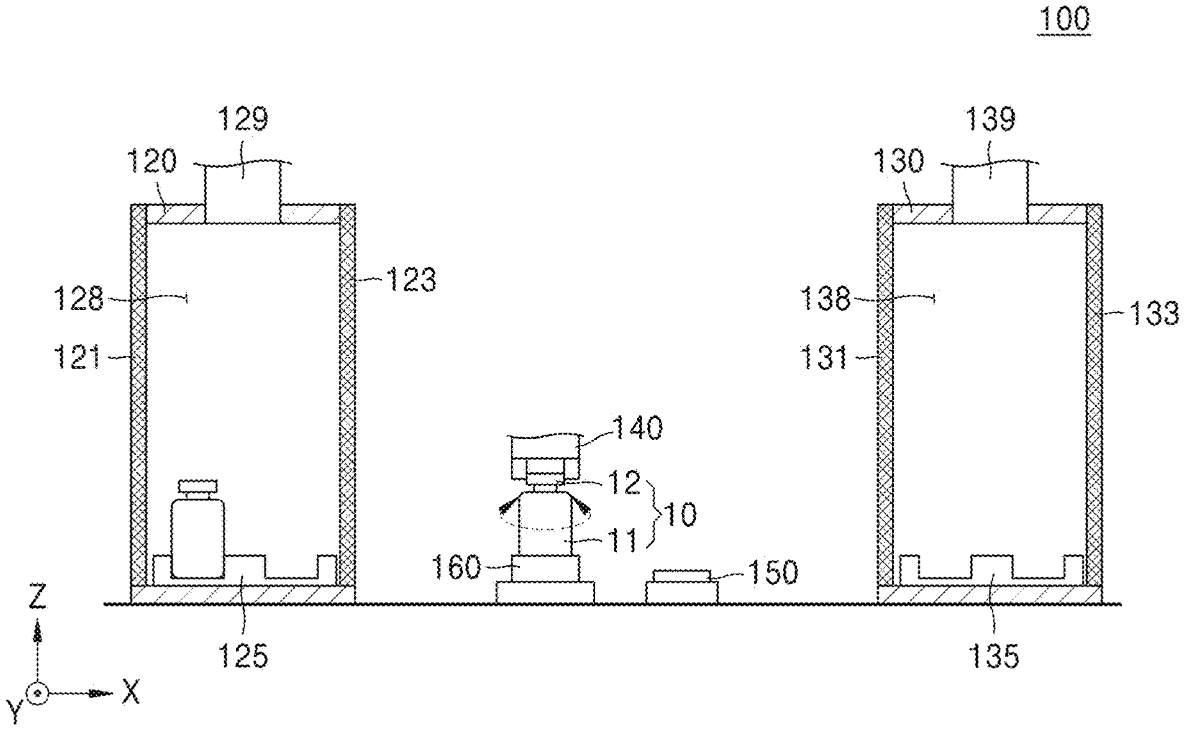

Referring to FIG. 4B, when the carrying robot 140 removes the container 10 from the first stocker 120, the first rear stocker door 123 of the first stocker 120 is switched to a closed position. Subsequently, the carrying robot 140 conveys the container 10 to the rotary table 160. If necessary, the rotary table 160 may rotate the container 10 such that the container 10 is oriented in a predetermined direction or may rotate the container body 11 relative to the lid 12 to regulate the locking torque between the container body 11 and the lid 12.

Figure 4C:
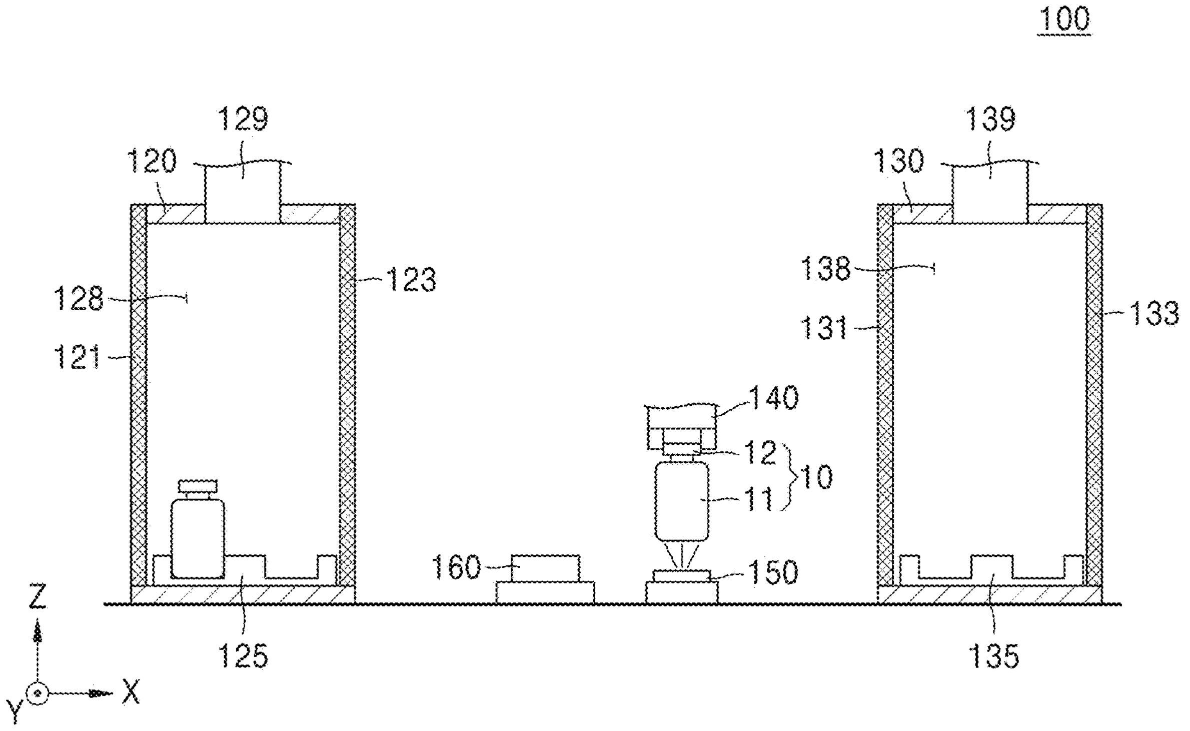

Referring to FIG. 4C, the first label reader 150 may recognize the identification label 13 on the container 10 while the carrying robot 140 conveys the container 10. The information recognized by the first label reader 150 is transmitted to the main controller; this information may be used to detect and register the position of the particular container 10 associated with the recognized identification label 13 inside the sample analysis system 1000. (The container 10's position at which the identification label is recognized may be based on the setup of the first label reader 150, e.g., stationary or in motion.) Thus, locations of different containers 10 corresponding to respective identification labels 13 may be tracked on a real time basis.

Figure 4D:
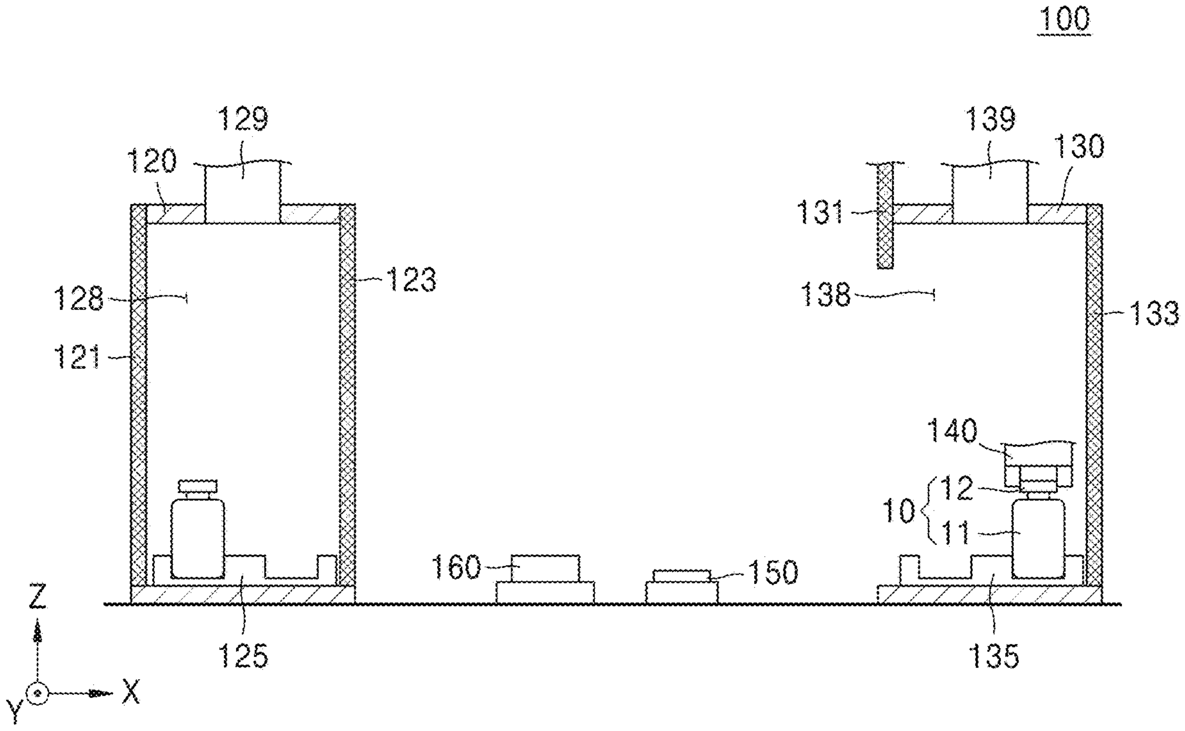

Referring to FIG. 4D, after the second front stocker door 131 of the second stocker 130 is switched to an open position, the gripper finger of the carrying robot 140 enters the second stocker 130. Then, the container 10 is placed on the second container table 135 using the carrying robot 140.

Subsequently, the carrying robot 140 releases the container 10, the gripper finger of the carrying robot 140 moves to the exterior of the second stocker 130, and the second front stocker door 131 of the second stocker 130 is switched from the open position to a closed position.

Next, the main controller transmits, to the transfer robot 500, a work command for conveying the container 10, and the transfer robot 500 that receives the work command moves to the first rear door 113 of the carry-in chamber 110. When the transfer robot 500 to which the work command is assigned arrives in front of the first rear door 113, the first rear door 113 and the second rear stocker door 133 are switched to an open position. Subsequently, the transfer robot 500 may remove the container 10 from the second stocker 130 and hold the same.

Figure 5A:
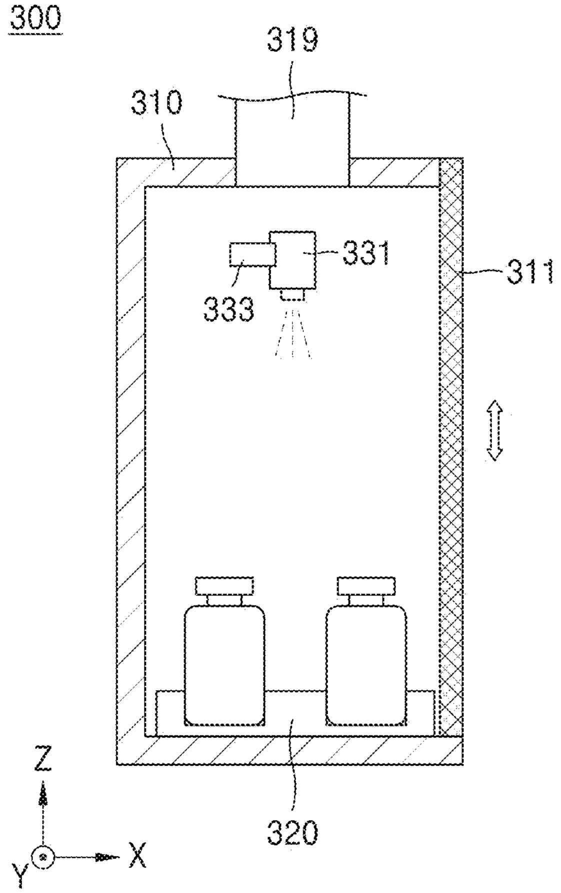
FIGS. 5A and 5B are configuration diagrams showing a buffer device according to embodiments.
Figure 5B:
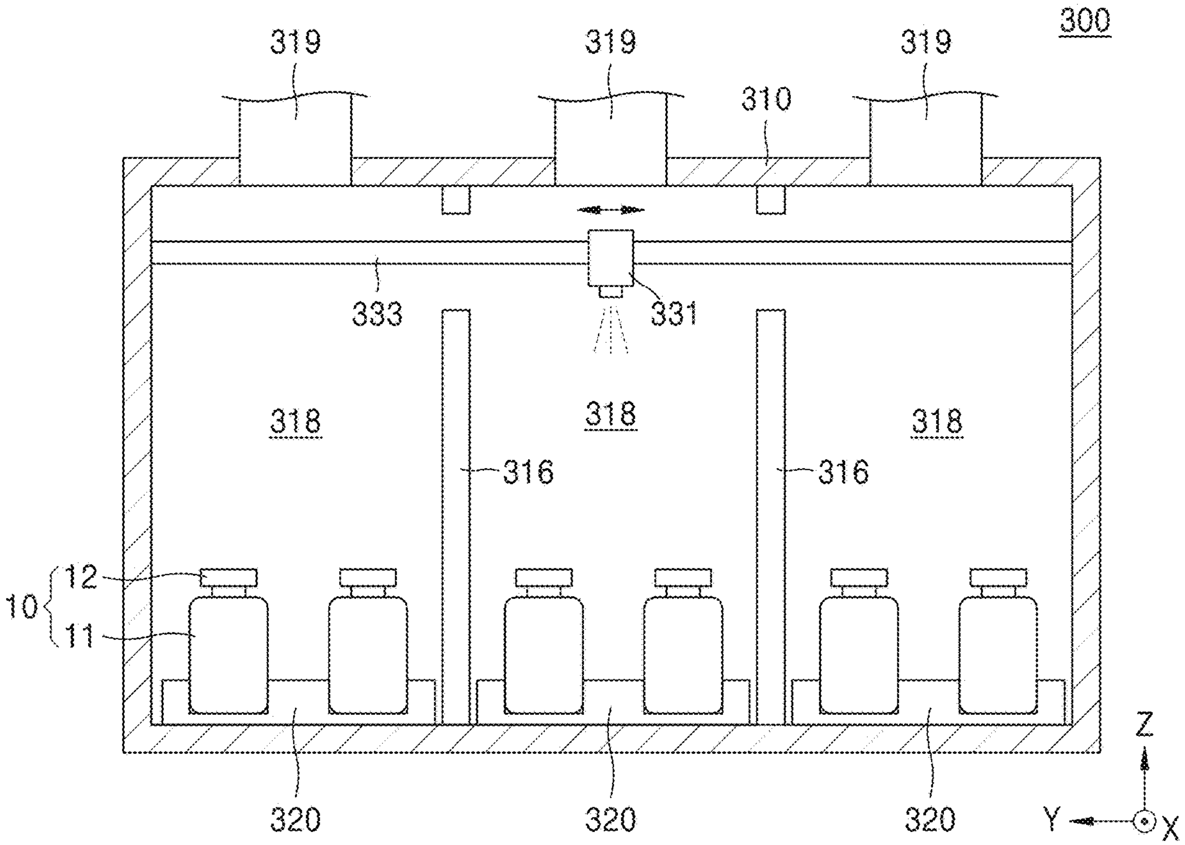

FIGS. 5A and 5B are configuration diagrams showing the buffer device 300 according to embodiments.

Referring to FIGS. 5A and 5B, the buffer device 300 may provide a buffer space for temporarily storing the container 10 in the analysis part SB. For example, when: (i) a facility (e.g., the analysis device 410 or the cleaning device 420) at a conveyance destination of a first container 10 is in operation; (ii) a facility at a conveyance destination of the first container 10 is full of other containers 10, thus rendering it impossible to carry an additional container 10 in the facility; and/or (iii) a second container 10 containing a sample for which primary analysis has been completed waits until a pass/fail decision result for determining whether to perform re-analysis is confirmed before the second container 10 is conveyed to the cleaning device 420, then the first container 10 may be temporarily stored in the buffer device 300.

The buffer chamber 310 of the buffer device 300 may include a plurality of sub-spaces 318 partitioned by partition walls 316. In the buffer chamber 310, each of the sub-spaces 318 communicates with an exhaust port 319 and may be exhausted through an exhaust device connected to the exhaust port 319.

A buffer table 320 on which a plurality of containers 10 are mounted may be provided in each of the sub-spaces 318 of the buffer chamber 310. The plurality of sub-spaces 318 of the buffer chamber 310 may respectively accommodate containers 10 that contain samples of different properties.

For example, in the buffer chamber 310, one of the plurality of sub-spaces 318 may be provided with a buffer table 320 on which a container 10 containing an acid sample is mounted, another one of the plurality of sub-spaces 318 may be provided with a buffer table 320 on which a container 10 containing a base sample is mounted, and the other one of the plurality of sub-spaces 318 may be provided with a buffer table 320 on which a container 10 containing an organic sample is mounted.

The buffer chamber 310 may include a plurality of buffer doors 311 that are independently driven. In the buffer chamber 310, each of the buffer doors 311 may be configured to open and close an entrance of a corresponding sub-space 318 among the plurality of sub-spaces 318 of the buffer chamber 310. The transfer robot 500 may carry the container 10 in and out of the buffer chamber 310. For instance, when the transfer robot 500 arrives in front of the buffer device 300, one of the plurality of buffer doors 311 of the buffer chamber 310 is opened. Then, the transfer robot 500 may carry the container 10 in or out of the buffer chamber 310.

The buffer device 300 may include a label reader 331 provided in the buffer chamber 310. The label reader 331 may detect the identification label 13 of the container 10 mounted on the buffer table 320. For example, the label reader 331 may be located in an upper region or a lower region inside the buffer chamber 310. Accordingly, depending on the position of the label reader 331, the identification label 13 provided on the lid 12 or the bottom of the container body 11 of the container 10 may be detected. The label reader 331 may be or include a stationary reader 331 or a movable reader 331 that moves along a predetermined path. The label reader 331 may include an image sensor, a camera, or a barcode scanner.

In embodiments, the label reader 331 may be configured to move along a guide rail 333 provided in the buffer chamber 310. The guide rail 333 may extend across the plurality of sub-spaces 318 of the buffer chamber 310, and the label reader 331 may be moved along the guide rail 333 by an actuator. As the label reader 331 is configured to move, a scanning range of the label reader 331 may cover all of the buffer tables 320 in the buffer chamber 310. The information recognized by the label reader 331 is transmitted to the main controller, and such information may be used to detect and register the position of the particular container 10 associated with the information inside the sample analysis system 1000.

Figure 6A:
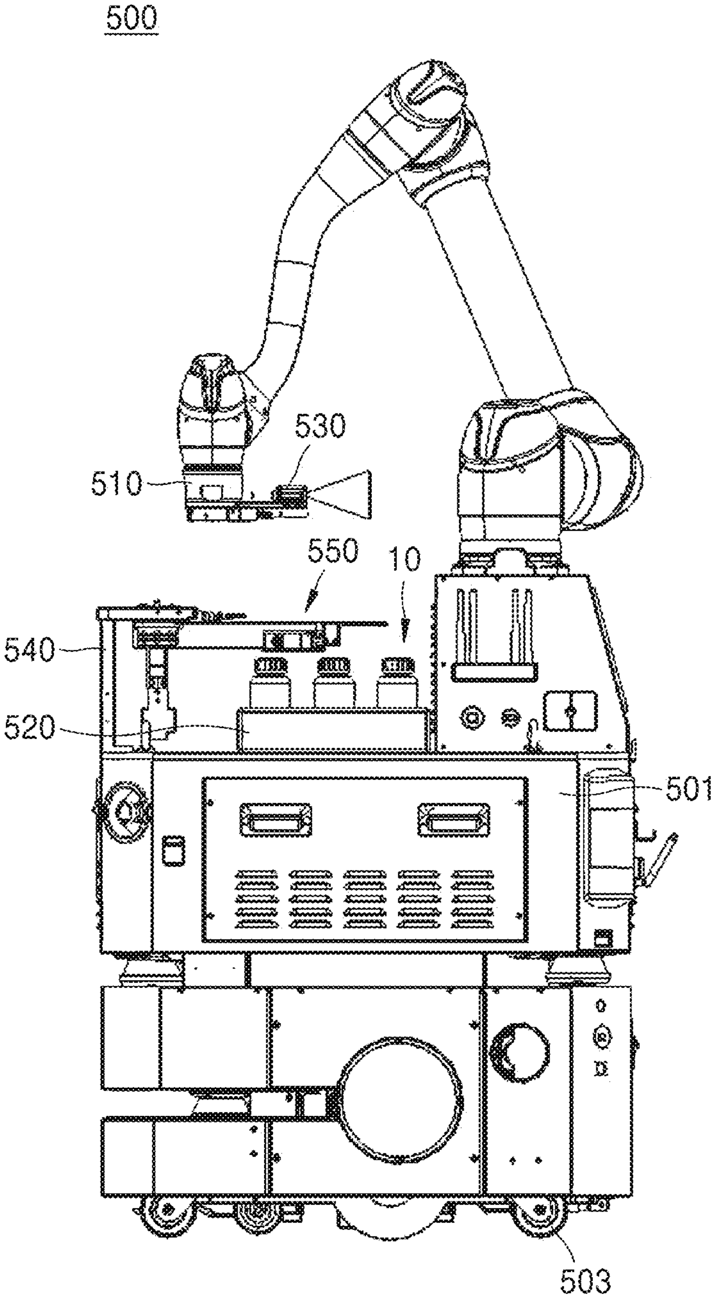
FIG. 6A is a side view showing a transfer robot according to embodiments.
Figure 6B:
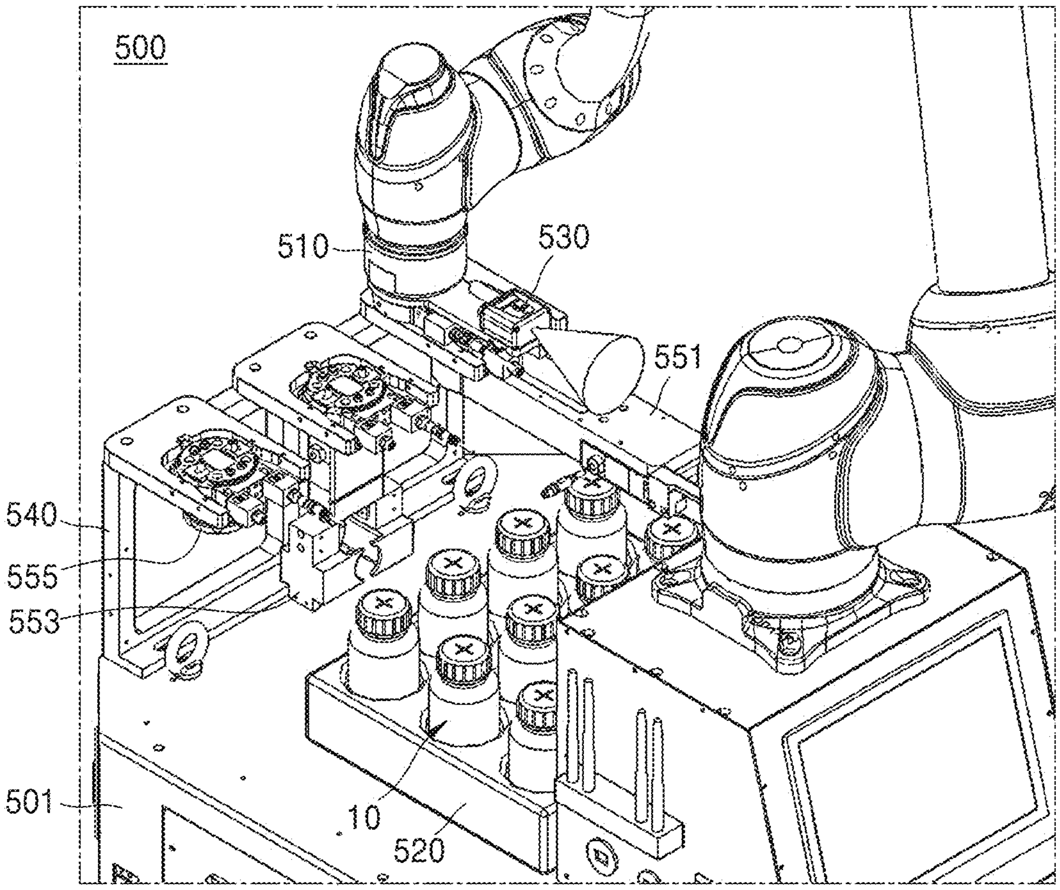
FIG. 6B is a perspective view showing a portion of the transfer robot according to embodiments.

FIG. 6A is a side view showing the transfer robot 500 according to embodiments. FIG. 6B is a perspective view showing a portion of the transfer robot 500 according to embodiments.

Referring to FIGS. 6A and 6B, the transfer robot 500 may include a robot body 501, a robot arm 510, a carrier 520, a vision sensor 530, a holder 540, and an end effector 550.

The robot body 501 may include a frame forming the exterior of the transfer robot 500 and various components mounted on the frame. The robot body 501 may include driving wheels 503 which are provided on the bottom of the robot body 501 and connected to a motor. The robot body 501 may include a battery that is charged by the charger 590. When the conveyance work is not performed or when a charging rate of the battery is less than a certain level, the transfer robot 500 may move to the charger 590 to charge the battery.

The carrier 520 may be provided on a mounting surface of the robot body 501. A plurality of containers 10 may be mounted on the carrier 520.

The end effector 550 may be mounted to the holder 540, which is coupled to the robot body 501. The end effector 550 may be utilized by being coupled to an end of the robot arm 510. The end effector 550 may be provided for handling of the container 10, such as gripping the container 10, holding the container 10, and separating the lid 12 from or coupling the lid 12 to the container body 11. The transfer robot 500 may include at least one end effector 550. When the transfer robot 500 includes a plurality of end effectors 550 having different respective structures, the end effectors 550 may be used to perform different types of work. In embodiments, the transfer robot 500 may include first to third end effectors 551, 553, and 555 (each an example of an end effector 550) held by the holder 540, where one of the first to third end effectors 551, 553, and 555 may be mounted to the robot arm 510 according to the assigned work.

The robot arm 510 may be connected to the robot body 501. The robot arm 510 may perform tasks for handling the container 10 using the end effector 550 coupled to the end of the robot arm 510. The end effector 550 may be detachably coupled to the robot arm 510. The robot arm 510 may be referred to as a manipulator. The robot arm 510 may have an auto tool changer function for attaching or detaching an end effector 550 suitable for performing an assigned task among the plurality of end effectors 550. The vision sensor 530 may be coupled to the robot arm 510 and may be located near the end of the robot arm 510. The vision sensor 530 may include an image sensor, a camera, and the like. The vision sensor 530 may recognize an object around the transfer robot 500, an object around the robot arm 510, a container 10 to be conveyed, an identification label 13 on the container 10, and the like. The transfer robot 500 may perform tasks on the basis of information recognized by the vision sensor 530.

Figure 7A:
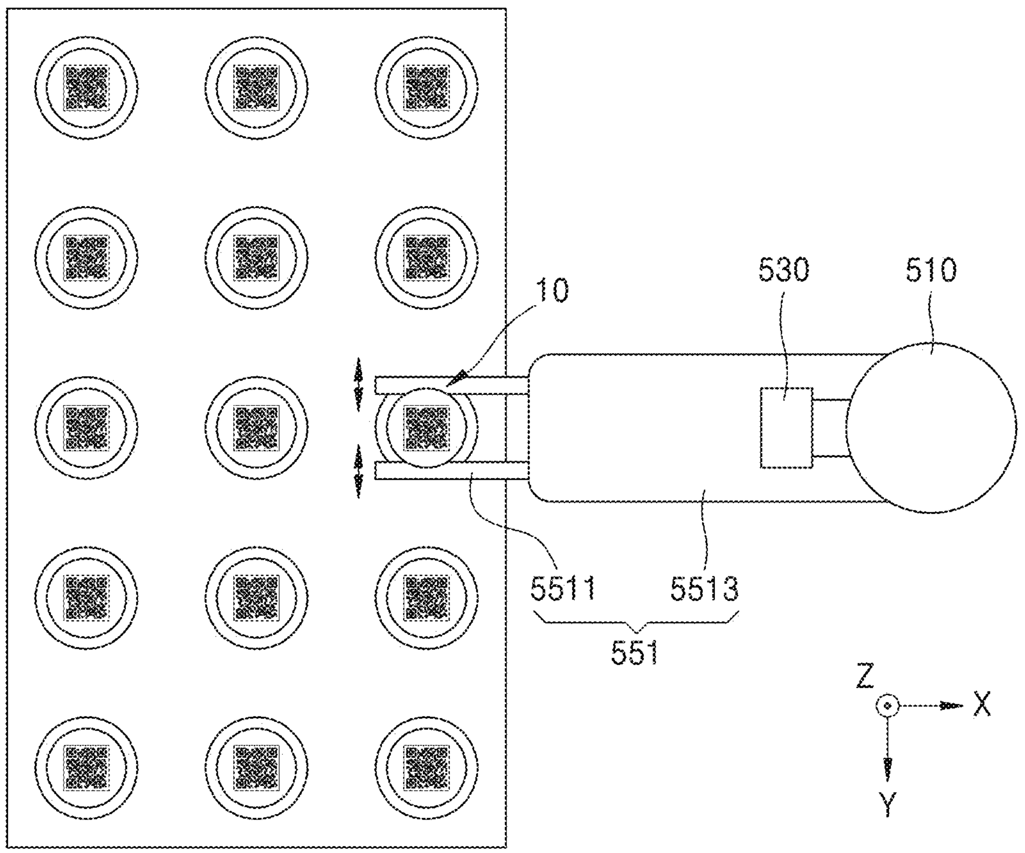
FIGS. 7A, 7B and 7C are views showing respective examples of an end effector of a transfer robot.
Figure 7B:
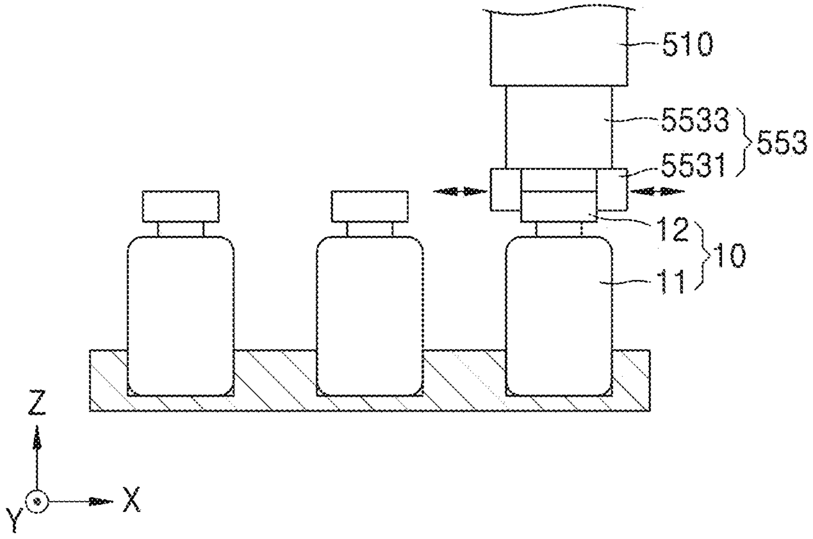
Figure 7C:
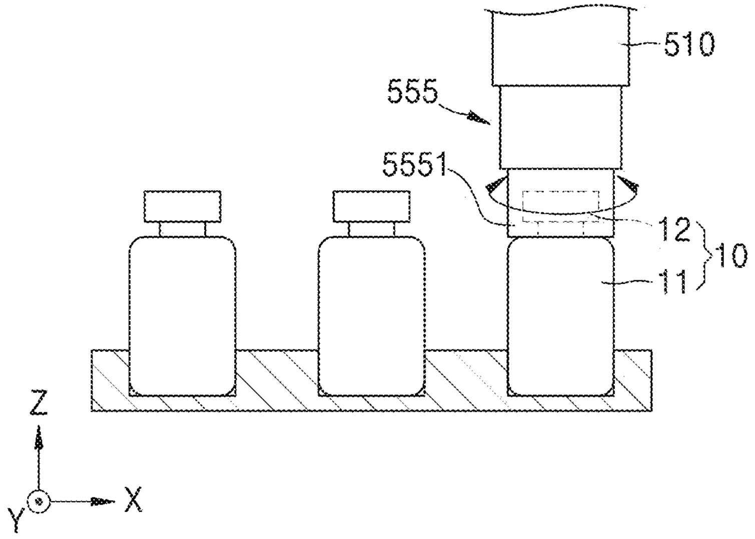

FIGS. 7A to 7C are views each showing an example of an end effector 550 of the transfer robot 500.

Referring to FIG. 7A together with FIG. 6B, the first end effector 551 (an example of an end effector 550) may include a first member (e.g., a frame) 5513 extending in a horizontal direction (e.g., parallel to the ground, anywhere in the X-Y plane of FIG. 7A) and a first gripper finger 5511 for gripping and holding the container 10. One end of the first member 5513 in the horizontal direction may be connected to the robot arm 510, and an opposite end of the first member 5513 in the horizontal direction may be connected to the first gripper finger 5511. In the first member 5513, the one end of the first member 5513 connected to the robot arm 510 and the opposite end of the first member 5513 connected to the first gripper finger 5511 may be spaced a certain distance from each other in the horizontal direction. A direction in which the first member 5513 extends may be perpendicular to a direction of the container 10 gripped by the first gripper finger 5511 (for example, a direction parallel to a straight line connecting the center of the bottom of the container body 11 to the center of the lid 12). The first gripper finger 5511 may grip an upper portion of the container 10. The first gripper finger 5511 may be switched between a grip-position, at which the first gripper finger 5511 grips the container 10, and an ungrip-position (release position), at which the first gripper finger 5511 is spaced apart from the container 10 to allow the container 10 to escape from the first gripper finger 5511. The first gripper finger 5511 may be switched between the grip-position and the ungrip-position by an actuator. The robot arm 510 may not enter the interior of a target facility because it is too large (where a facility may be the container carry-in device 100, the container carry-out device 200, the buffer device 300, the analysis device 410, or the cleaning device 420). In this case, the first end effector 551 including the first member 5513 extending in the horizontal direction may be mounted on the robot arm 510 of the transfer robot 500, and the container 10 may be carried in and out of the target facility using the first end effector 551.

Referring to FIG. 7B together with FIG. 6B, the second end effector 553 (another example of an end effector 550) may include a second member (e.g., a frame) 5533 extending in a vertical direction (e.g., a Z direction) and a second gripper finger 5531 for gripping and holding the container 10. One end of the second member 5533 in the vertical direction may be connected to the robot arm 510, and an opposite end of the second member 5533 in the vertical direction may be connected to the second gripper finger 5531. A direction in which the second member 5533 extends may be parallel to a direction of the container 10 gripped by the second gripper finger 5531 (for example, a direction parallel to a straight line connecting the center of the bottom of the container body 11 to the center of the lid 12). The second gripper finger 5531 may grip an upper portion of the container 10, for example, the lid 12. The second gripper finger 5531 may be switched between a grip-position, at which the second gripper finger 5531 grips the container 10, and an ungrip-position, at which the second gripper finger 5531 is spaced apart from the container 10 to allow the container 10 to escape from the second gripper finger 5531. The second gripper finger 5531 may be switched between the grip-position and the ungrip-position by an actuator. The second end effector 553 is mounted to the robot arm 510 of the transfer robot 500, and the container 10 may be carried in and out of a target facility (e.g., the container carry-in device 100, the container carry-out device 200, the buffer device 300, the analysis device 410, or the cleaning device 420) using the second end effector 553.

Referring to FIG. 7C together with FIG. 6B, the third end effector 555 (a further example of an end effector 550) may rotate the lid 12 relative to the container body 11 to separate the lid 12 from the container body 11 or couple the lid 12 to the container body 11. The third end effector 555 may include a third gripper finger 5551 configured to grip the lid 12 and a rotary actuator configured to rotate the third gripper finger 5551. While the third gripper finger 5551 grips the lid 12, the third gripper finger 5551 is rotated by the rotary actuator to cause relative rotation between the lid 12 and the container body 11. Before the container 10 is carried in a target facility (e.g., the analysis device 410), the transfer robot 500 opens the inlet of the container body 11 using the third end effector 555 so as to remove the lid 12 from the container body 11. Also, the transfer robot 500 may hold and store the lid 12 separated from the container body 11. In addition, before the container 10 is carried out of the target facility (e.g., the analysis device 410), the transfer robot 500 may couple the lid 12 to the container body 11 using the third end effector 555 so as to close the inlet of the container body 11.

Figure 8:
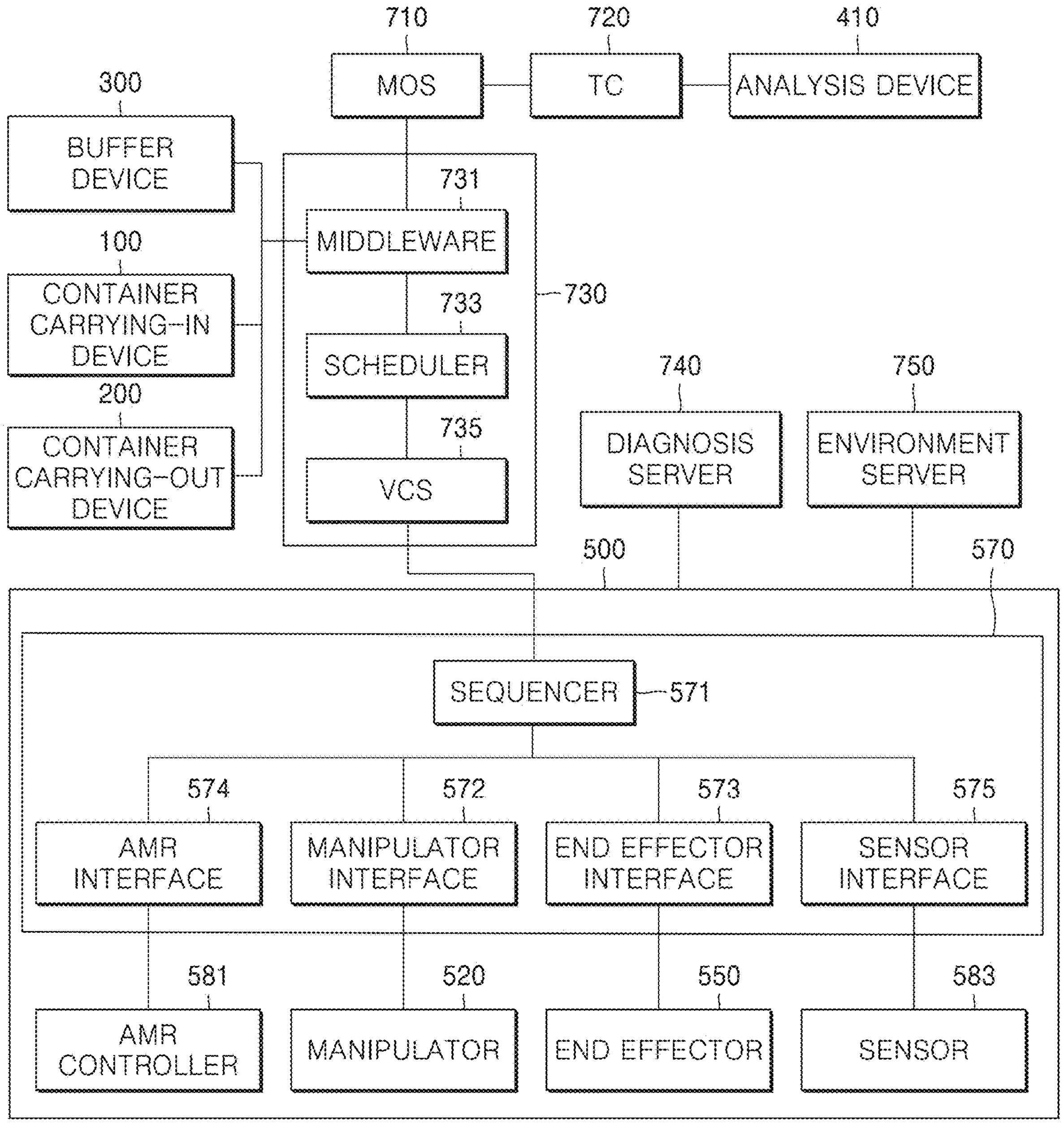
FIG. 8 is a block diagram showing a sample analysis system according to embodiments.

FIG. 8 is a block diagram showing a sample analysis system 1000 according to embodiments.

Referring to FIG. 8, the sample analysis system 1000 may include a manufacturing operating system (MOS) 710, a tool controller 720, an analysis device 410, and a distribution controller 730. All of the analysis devices 410 provided in an analysis part SB report their respective statuses (e.g., whether they're operating normally, work progress statuses, sensing values of various sensors, etc.) to the tool controller 720. The tool controller 720 has control command authority for each analysis device 410 and reports status information of each analysis device 410 transmitted from each respective analysis device 410 to the MOS 710.

The MOS 710, the tool controller 720, and the distribution controller 730 may together constitute a main controller. The main controller may include memory devices, such as read only memory (ROM) and random access memory (RAM) in which various programming instructions are stored, and processors configured to process programming instructions stored in the memory devices and signals provided from an exterior source. Examples of the processors may include a microprocessor, a central processing unit (CPU), and a graphics processing unit (GPU).

The distribution controller 730 may be configured at a lower part of the MOS 710 and controlled by the MOS 710. The distribution controller 730 may include a middleware device 731, a scheduler 733, and a vehicle control system (VCS) 735. From facilities that store containers 10 (e.g., a container carry-in device 100, a container carry-out device 200, and a buffer device 300), the middleware device 731 may receive inventory information of the containers 10, (e.g., whether they contain a sample, and the type of sample, or are empty) and information about whether the containers 10 can be carried in and out. The distribution controller 730 may check current positions of all the containers 10 in real time on the basis of the received inventory information about the containers 10. The scheduler 733 of the distribution controller 730 may generate a container conveyance schedule on the basis of the information received by the middleware device 731. The container conveyance schedule may include a conveyance path and a storage plan for the containers 10. For example, the positions of all the containers 10 may be checked on the basis of information obtained as a first label reader 150 of the container carry-in device 100, a second label reader 230 of the container carry-out device 200, and/or the label reader 331 of the buffer device 300 detect identification labels 13 of the containers 10. Also, the container conveyance schedule may be created on the basis of the positions of all the containers 10. The VCS 735 may control the transfer robot(s) 500 provided in the analysis part SB. The VCS 735 may assign work commands, such as conveying of the containers 10, carry-in of the containers 10, carry-out of the containers 10, and the like, on the basis of the container conveyance schedule. In embodiments, the MOS 710 may be omitted in the sample analysis system 1000. In this case, the distribution controller 730 may directly receive the information from the tool controller 720 and the analysis device 410.

The transfer robot 500 may include a robot controller 570 configured to communicate with the distribution controller 730. The robot controller 570 may include a sequencer 571 which collectively manages control for performing tasks of the transfer robot 500, a manipulator interface 572 through which signals for a robot arm 510 are transmitted, an end effector interface 573 through which signals for an end effector 550 are transmitted, an autonomous mobile robot (AMR) interface 574 through which signals for an AMR controller 581 are transmitted, and a sensor interface 575 through which sensing signals generated by various sensors 583 provided in the transfer robot 500 are transmitted. The transfer robot 500 may include a user interface for manipulation of an operator and a PIO interface through which communication signals with facilities are transmitted. The user interface and the PIO interface may be connected to the sequencer 571. In embodiments, the transfer robot 500 may include a diagnosis sensor for robot diagnosis and an environment sensor, where the data obtained by the diagnosis sensor and the environment sensor of the transfer robot 500 may be provided to a diagnosis server 740 and an environment server 750 which are located externally of the transfer robot 500. The robot controller 570 may include memory devices, such as ROM and RAM in which various programming instructions are stored, and processors configured to process programming instructions stored in the memory devices and signals provided from the exterior.

Hereinafter, a sample analysis method according to embodiments is described with reference to FIGS. 1 to 8.

The sample analysis method according to embodiments allows tasks performed for sample analysis to be unmanned and automated. The sample analysis method includes: (i) carrying a container 10 containing a sample into a carry-in chamber 110 of a container carry-in device 100; (ii) conveying the container 10 from the container carry-in device 100 to an analysis device 410 using a transfer robot 500; (iii) analyzing the sample contained in the container 10 using the analysis device 410; (iv) conveying the container 10 from the analysis device 410 to a cleaning device 420 using the transfer robot 500; (v) cleaning the container 10 using the cleaning device 420; (vi) carrying the cleaned container 10 into the carry-out chamber 210 using the transfer robot 500; and (vii) carrying an empty (cleaned) container 10 out of a carry-out chamber 210 of a container carry-out device 200 (alternatively, discarding the cleaned container 10 in a suitable waste container). Note that the method may also include carrying an empty container (never previously used) out of a container carry-out device 200, whereupon the operator may place a sample therein for sample analysis.

In embodiments, the sample analysis method may include conveying the container 10 to a buffer device 300 using the transfer robot 500 and storing the container 10 in the buffer device 300. For example, when the analysis device 410 is in operation and when the analysis device 410 is full of containers 10 and thus it is impossible to carry an additional container 10 into the analysis device 410, the container 10 may temporarily remain in the buffer device 300. For example, the container 10 on which sample analysis has been completed is conveyed from the analysis device 410 to the buffer device 300, and the container 10 may temporarily remain inside the buffer device 300 until a pass/fail decision result for determining whether to perform re-analysis is confirmed. When the sample analysis result satisfies predetermined criteria and the container 10 is determined to pass, the container 10 is then conveyed from the buffer device 300 to the cleaning device 420. When the sample analysis result does not satisfy the predetermined criteria and the container 10 is determined to fail, the container 10 is conveyed back to the analysis device 410 for re-analysis.

In embodiments, each of the carry-out of the container 10, the carry-in of the container 10, and the storing of the container 10 in the buffer device 300 may include detecting an identification label 13 on the container 10. On the basis of the inventory information of containers 10 obtained by detecting the identification labels 13 of the containers 10, the current positions of the containers 10 may be checked in real time, and the container conveyance schedule may be established.

According to the embodiments, it is possible to automate tasks performed for sample analysis, for example, conveying a container 10 containing a sample to a target point, opening and closing a lid 12 of the container 10, analyzing the sample, discarding the sample, cleaning the container 10, and supplying an empty container 10 (either cleaned or never used) to an external operator 950. The sample analysis work may be automated. Accordingly, it is possible to prevent a hazardous condition with respect to the operator

950 occurring in a process of handling a sample harmful to the human body, and to improve efficiency of the sample analysis work.

While the inventive concept has been particularly shown and described with reference to embodiments thereof, it will be understood that various changes in form and details may be made therein without departing from the spirit and scope of the following claims.

What is claimed is:

1. A sample analysis system comprising:

a loading/unloading part comprising a container carry-in device, by which a container containing a sample is carried in, and a container carry-out device, by which an empty container from which the sample has been removed is carried out; and an analysis part comprising a buffer device configured to store the container, an analysis device configured to analyze the sample contained in the container, a cleaning device configured to clean the container, and a transfer robot configured to convey the container, wherein the container carry-in device comprises:

a carry-in chamber comprising a front door and a rear door, the rear door being configured to open and close a passage between a carry-in space of the carry-in chamber and the analysis part;

a first container table located on one side of the front door and on which the container is placed;

a second container table located on one side of the rear door and on which the container is placed;

a carrying robot configured to convey the container between the first container table and the second container table; and a label reader configured to detect an identification label on the container.

2. The sample analysis system of claim 1, wherein:

the front door is a first front door, the rear door is a first rear door, and the label reader is a first label reader; and the container carry-out device comprises:

a carry-out chamber comprising a second front door and a second rear door, the second rear door being configured to open and close a passage between a carry-out space of the carry-out chamber and the analysis part;

a support shelf on which the empty container is placed; and a second label reader configured to detect the identification label on the empty container.

3. The sample analysis system of claim 2, wherein each of the first rear door and the second rear door is configured to be opened and closed by a control signal of the transfer robot.

4. The sample analysis system of claim 1, wherein the label reader is configured to detect the identification label on the container held by the carrying robot while the carrying robot conveys the container between the first container table and the second container table.

5. The sample analysis system of claim 1, wherein the container carry-in device further comprises a rotary table located between the first container table and the second container table and configured to rotate the container.

6. The sample analysis system of claim 5, wherein the container comprises a container body and a lid for opening and closing an inlet of the container body, and the rotary table is configured to rotate the container body of the container while the carrying robot grips the lid of the container, to thereby adjust torque between the container body and the lid.

7. The sample analysis system of claim 1, wherein the buffer device comprises:

a buffer chamber comprising a buffer door;

a buffer table, located inside the buffer chamber, and upon which the container is placed; and a further label reader configured to detect the identification label on the container placed on the buffer table.

8. The sample analysis system of claim 7, wherein the further label reader is configured to move along a guide rail provided in the buffer chamber.

9. The sample analysis system of claim 1, wherein the transfer robot comprises:

a carrier on which the container is placed;

an end effector configured to grip the container;

a holder onto which the end effector is mounted; and a robot arm from which the end effector is detachably coupled.

10. The sample analysis system of claim 9, wherein the transfer robot further comprises a vision sensor mounted onto the robot arm.

11. The sample analysis system of claim 1, wherein the transfer robot comprises:

a carrier upon which the container is placed;

a plurality of end effectors configured to handle the container;

a holder onto which the plurality of end effectors are mounted; and a robot arm from which one of the plurality of end effectors is detachably coupled.

12. The sample analysis system of claim 11, wherein the plurality of end effectors comprise:

a first end effector comprising a first member connected to the robot arm and extending in a horizontal direction and a first gripper finger connected to the first member and configured to grip the container; and a second end effector comprising a second member connected to the robot arm and extending in a vertical direction and a second gripper finger connected to the second member and configured to grip the container.

13. The sample analysis system of claim 12, wherein the plurality of end effectors further comprise a third end effector configured to separate a lid of the container from a container body of the container or to couple the lid to the container body.

14. The sample analysis system of claim 1, wherein the analysis part further comprises a charger for charging a battery of the transfer robot.

15. The sample analysis system of claim 1, wherein the transfer robot is configured to convey the container between two devices selected from among the container carry-in device, the container carry-out device, the buffer device, the analysis device, and the cleaning device.

16. A sample analysis system comprising:

a loading/unloading part comprising a container carry-in device, by which a container containing a sample is carried in, and a container carry-out device, by which an empty container from which the sample has been removed is carried out; and an analysis part comprising a buffer device configured to store the container, an analysis device configured to analyze the sample contained in the container, a cleaning device configured to clean the container, and a transfer robot configured to convey the container, wherein the container carry-in device comprises:

a carry-in chamber comprising a first front door and a first rear door, the first rear door being configured to open and close a passage between a carry-in space of the carry-in chamber and the analysis part;

a first container table located on one side of the first front door and upon which the container is placed;

a second container table located on one side of the first rear door and upon which the container is placed;

a carrying robot configured to convey the container between the first container table and the second container table; and a first label reader configured to detect an identification label on the container, wherein the container carry-out device comprises:

a carry-out chamber comprising a second front door and a second rear door, the second rear door being configured to open and close a passage between a carry-out space of the carry-out chamber and the analysis part;

a support shelf upon which the empty container is placed; and a second label reader configured to detect the identification label on the empty container, wherein the buffer device comprises:

a buffer chamber comprising a buffer door;

a buffer table located inside the buffer chamber and upon which the container is placed; and a third label reader configured to detect the identification label on the container placed on the buffer table.

17. The sample analysis system of claim 16, further comprising a controller configured to detect a position of the container on the basis of information obtained by the first label reader, the second label reader, and the third label reader that detect the identification label of the container.

18. The sample analysis system of claim 16, wherein the transfer robot comprises:

a carrier upon which the container is placed;

a plurality of end effectors configured to handle the container;

a holder onto which the plurality of end effectors are mounted;

a robot arm from which one of the plurality of end effectors is detachably coupled; and a vision sensor mounted onto the robot arm and configured to detect the identification label on the container.

19. The sample analysis system of claim 18, wherein the plurality of end effectors comprise:

a first end effector that comprises a first member connected to the robot arm and extending in a horizontal direction, and a first gripper finger connected to the first member and configured to grip the container;

a second end effector that comprises a second member connected to the robot arm and extending in a vertical direction and a second gripper finger connected to the second member and configured to grip the container; and a third end effector configured to separate a lid of the container from a container body of the container or to couple the lid to the container body.

20. A sample analysis system comprising:

a loading/unloading part comprising a container carry-in device, by which a container containing a sample is carried in, and a container carry-out device, by which an empty container from which the sample has been removed is carried out; and an analysis part comprising a buffer device configured to store the container, an analysis device configured to analyze the sample contained in the container, a cleaning device configured to clean the container, and a first robot configured to convey the container, wherein the container carry-in device comprises:

a carry-in chamber comprising a front door and a rear door, the rear door being configured to open and close a passage between a carry-in space of the carry-in chamber and the analysis part;

at least one surface, located in the carry-in space, upon which the container is placed;

a second robot configured to convey the container between a first position on the at least one surface closer to the front door than the rear door, to a second position on the at least one surface closer to the rear door than the front door; and a label reader configured to detect an identification label on the container.

* * * * *